June 10, 1924.
E. SIEGEL
LOCK
Filed Feb. 23, 1922
1,496,788
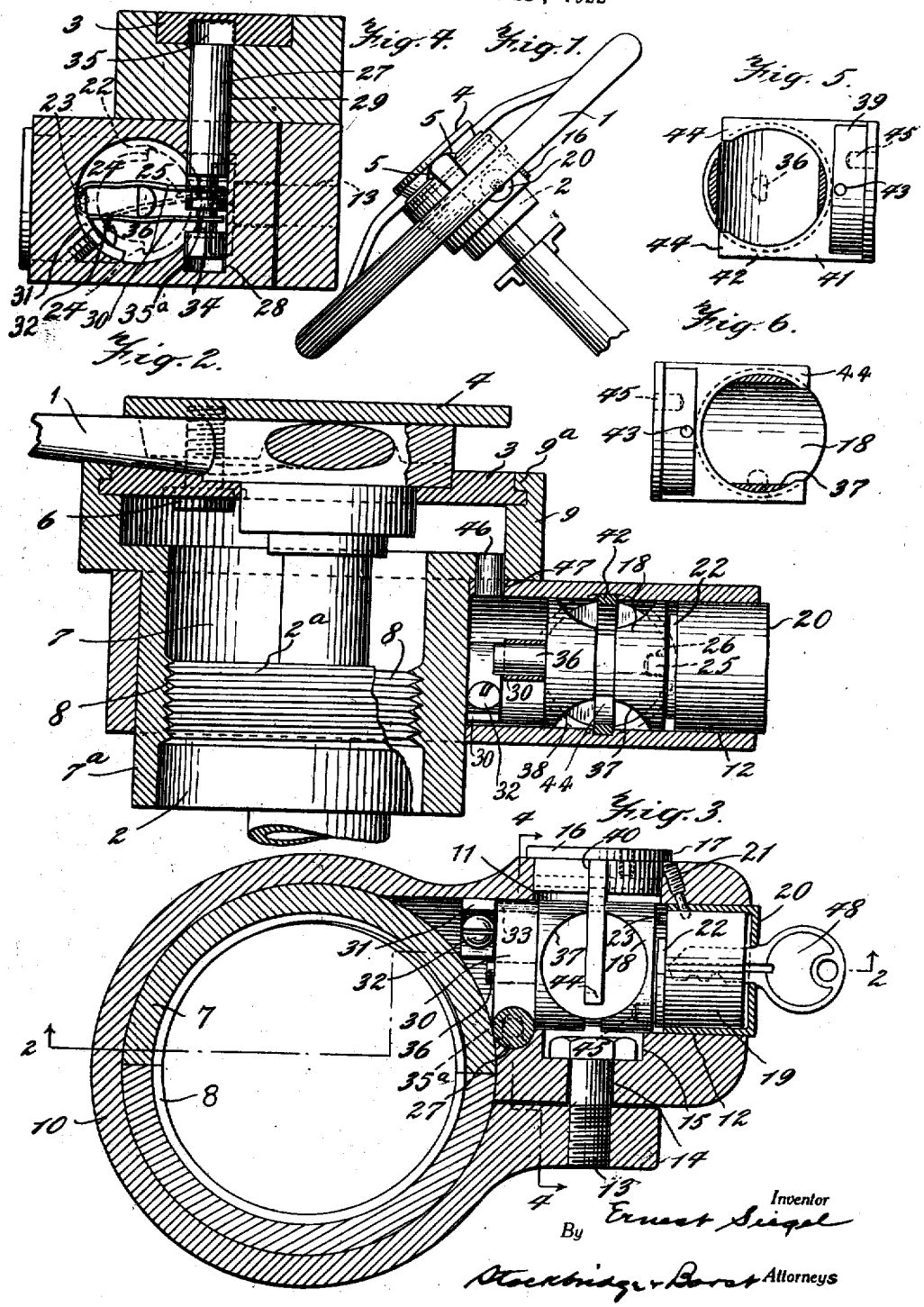
Inventor
Ernest Siegel
By
Stockbridge & Borst Attorneys Patented June 10, 1924.

1,496,788

UNITED STATES PATENT OFFICE.

ERNEST SIEGEL, OF NEW YORK, N. Y., ASSIGNOR TO AUTO KONTROL LOCK CORPORATION, A CORPORATION OF NEW YORK.

LOCK.

Application filed February 23, 1922. Serial No. 538,430.

*To all whom it may concern:*

Be it known that I, ERNEST SIEGEL, a citizen of the United States, residing at the city of New York, in the county of New York and State of New York, have invented certain new and useful Improvements in Locks, of which the following is a full, clear, and exact description.

This invention relates to locks for motor vehicles for the purpose of preventing the theft or unauthorized operation of the vehicles, particularly by preventing operation of the steering mechanism thereof. Various locks of this type have been proposed heretofore but have proven unsatisfactory for several reasons. These proposed locks have either been susceptible of tampering or injury by a thief or unauthorized person within a short interval of time, in such a manner that the vehicle can be towed away or operated, or the locks have been too cumbersome and expensive. Other locking devices require changes in the steering mechanism in order to be applied to vehicles, which has greatly increased the cost of equipping vehicles with these locking devices.

An object of this invention is to provide an improved locking device for preventing relative movement between two parts of the vehicle, particularly the steering mechanism; which when in a locked condition will effectively conceal and protect the attaching means and the operating parts against tampering, injury or removal with ordinarily available tools; which is sufficiently strong and sturdy to be capable of withstanding severe blows or shocks without displacement or removal; which can be readily and easily attached to common makes of motor vehicles without changes in their steering mechanism; which when applied to the steering mechanism of vehicles having a gear box will prevent a nullification of the locking effect through damage to the gear box; and which is simple, inexpensive, effective and durable in construction. Other objects and advantages will be apparent from the following description and the novel features of the invention will be pointed out in claims.

The nature of the invention will appear from the following description of the preferred embodiment of the invention taken in connection with the accompanying drawings in which:

Fig. 1 is an elevation of a portion of the steering mechanism of a motor vehicle to which my improved lock has been applied.

Fig. 2 is a sectional elevation of the same taken substantially along the line 2—2 of Fig. 3.

Fig. 3 is a transverse section of the same.

Fig. 4 is a section of the same taken substantially along the line 4—4 of Fig. 3.

Fig. 5 is a sectional elevation of the cylinder and closure in which the cylinder is in a position to permit removal of the closure and Fig. 6 is another section of the same with the cylinder in a position to prevent removal of the closure.

In the illustrated embodiment the lock is applied between the steering wheel 1 and the relatively stationary gear box 2 that in certain makes of vehicles is provided upon the upper end of the steering column. The steering wheel is provided upon its under face with a flange-like extension 3 which may be cast upon and form a part of the hub of the steering wheel or may comprise a clamp formed by a flanged or cup-shaped plate 4 having slots 5 in the flange thereof for the passage of the spokes of the wheel and a plate forming the actual flange-like extension which is secured thereto by screws 6 passing through and countersunk in the under face of the plate of the flange-like extension 3, and threaded into the flange or rim of the plate 4. A longitudinally and axially split sleeve-like element 7 is provided at a point intermediate of its length with internal screw threads 8 which are adapted to engage and embrace the screw threads 2ª that are commonly provided with the upper end of the gear box 2 for the attachment of the cover of the box, the cover of the box being discarded when this device is attached thereto. The upper end of the split element 7 is provided with a peripheral flange 9 having an inturned peripheral edge 9ª which rotatively embraces and overlaps the flange-like extension 3 carried upon the under face of the steering wheel so that the steering wheel may be rotated relatively to the split element but will be held against removal therefrom in an axial direction.

A clamping ring 10 is split on one side so as to provide a spring clamp which fits over and embraces the hub of the split element 7. One of the arms of the spring clamp is provided with a pair of intersecting recesses 11 and 12. A screw 13 passes through an aperture 14 in the recessed arm of the clamp and is threaded into the other arm of the clamp so that rotation of the screw in threading it into the arm of the clamp will bring the two sections of the clamp together and securely clamp the sections of the split cylindrical element together and to the gear box 2 of the steering mechanism. The tubular skirt portion 7ª of the split element 7, extends beyond the screw threads of the gear box for a distance sufficient to cover the side walls of the gear box and protect the same from disablement of the steering mechanism by sawing or cutting the walls of the gear box. The head of the screw 13 is countersunk within a recess 15 in a wall of the recess 12 with sufficient clearance for a socket wrench that may be applied to the head of the screw. The recess 11 which is approximately in alignment with the screw is provided with a closure 16 having a boss of considerable depth so that it can be removed only by a movement axial to the recess and not by a rocking movement therein upon one edge. The closure is provided with a flange 17 which overlaps the wall surrounding the outer end of the recess 11 so as to limit the inward movement of the closure. Within the recess 12, which extends at substantially right angles to the recess 11, there is disposed a sleeve like cylindrical cage or member 18, which is rotatively mounted therein. A key operated cylinder lock 19 of well known construction is disposed in and closes the open end of the recess 12, a bushing 20 being disposed between the lock and the walls of the recess. A screw 21 is threaded within the wall of the ring surrounding the recess 12 and has an extension passing within an aperture in the bushing 20 and into the casing of the lock 19 to prevent rotation within the recesses of the casing and bushing and withdrawal of the same from the open end of the recess. The head of the screw 21 is concealed by the closure 16 so that the screw is only accessible for removal when the closure is removed. A cam 22 is carried by the cylinder of the lock 19 and is rotated thereby through approximately a half revolution, the movement being limited by a pin 23 on the end of the casing against which shoulders 24 of the cam engage at the limits of its movement. This cam carries a pin 25 which engages in a recess 26 in the abutting end of the cylinder 18 so that the rotation of the cylinder through the key will cause a corresponding rotation through a half revolution of the cylinder 18.

A locking member in the form of a bolt 27 is slidably mounted in a recess 28 in the recessed arm of the clamp, and in an aligned recess 29 of the flange of the split element 7. A narrow U-shaped spring 30 extends diametrically across the inner end of the cylinder and a clamping member 31, which is secured to the wall of the recess 12 by a screw 32, is provided with a lug 33 which extends within the base of the U of the spring 30 and clamps the spring to the wall of the recess 12 with the arms of the spring free to flex. The ends of the arms of the spring are forked and engage in grooves 34 in the bolt 27 on opposite sides of a collar 35ª thereon. A substantially semi-cylindrical pin 36 extends from the inner end of the cylinder and projects between the arms of the spring 30. The pin 36 acts as a cam upon the arms of the spring and at both of its limits of rotative movement is disposed with its flat surface against one or the other of the arms of the spring. In these positions one or the other of the arms of the spring will be free to act upon the locking bolt and yieldingly press the bolt into or out of the locking position. When the pin 36 is rotated through a half revolution the flat surface of the spring will be brought against the other arm of the spring the latter being then free to stress the locking bolt in the opposite direction to its other limit of movement, the curved surface of the pin acting as a cam to force the arm of the spring engaged thereby away from the collar 35ª so as not to oppose the action of the spring arm, which is then abutting the flat face of the pin, upon the bolt. The cylinder 18 is provided with a radially extending aperture 37 of a size sufficient to permit of passage of the head of the screw 13 and a socket wrench therefor, the aperture being brought into alignment with the recess 15 and the recess 11 in one of its rotative positions to permit of the insertion and operation of the screw 13 and its socket wrench in applying the clamp to the split element 7. Owing to the fact that the cylinder has a curved periphery the aperture 37 provides oppositely disposed arcuate cutaway clearance grooves 38 in the walls of the cylinder, advantage of which is taken in securing the closure to the clamp. The inwardly extending boss 39 of the closure 16 is provided with a diametrically disposed slot 40 in which is disposed a plate 41 having inwardly extending arms 42 which rotatively embrace the circumference of the cylinder 18. The plate 41 is held into the slot 40 by means of a pin 43 which passes through the portions of the boss 39 on opposite sides of the slot and through the plate 41. The arms 42 are provided at their inner ends with hook terminals 44 which extend toward one another, and each interlocks behind the cylinder to normally prevent removal of the closure. This position is illustrated in Fig. 6, and represents the position of the cylinder when the lock is in both locked and unlocked position. When the cylinder is rotated a quarter turn to the position shown in Figs. 2, 3 and 5, the clearance notches 38 will be brought into position to permit the passage of the hooked ends 44 of the extension of the closure so as to permit of the axial removal of the closure. The outer face of the closure is provided with a threaded recess 45 into which an eyebolt may be threaded to anchor the same thereto and provide a member which can be readily engaged for pulling the closure from the recess 11.

In the application of the improved lock to a vehicle, the flanged plate 4 is placed over the hub of the wheel with the spokes passing through the notches 5 of the flange and the extension is secured against the lower face of the wheel and to the plate 4 by means of the screws 6 which pass through the extension and upwardly into the plate 4. The split clamp 10 is passed downwardly over the gear box, while the steering wheel is removed from the steering rod, and is temporarily left in that position. After the steering wheel has been reapplied to the steering rod the sections of the split element 7 are caused to embrace the gear box with the internal threads of the element in engagement with the upper treaded end of the box and with the flange portion 9ª embracing in rotative engagement the flange-like extension 3 of the steering wheel. The split ring clamp is then brought upwardly over the gear box and the hub of the split element until it abuts against the under face of the flange portion 9 of the split element. A dowel pin 46 depending from the under face of the flange portion 9 of the split element is adapted to enter the recess 47 in the upper face of the clamp so as to insure bringing the recess 38 into alignment with the recess 29 of the flange portion of the split element and to hold them in alignment. With the closure 16 removed from the recess 11 the bolt 13 may be inserted into the recess 11 and through the aperture 37 of the cylinder, and the socket wrench will be passed through the recess 11 and the cylinder to engage the head of the screw and thread the screw into the other arm of the clamp to clamp the two free arms of the clamp together and press the sections of the split element firmly against the threaded peripheral surface of the gear box. After the removal of the socket wrench the closure may be reapplied to the recess 11 and the cylinder rotated to either limit of its movement while automatically locking the closure within the recess 11. If the cylinder 18 is rotated by means of a suitable key 48, in a direction to bring the arcuate surface of the cam pin 36 into engagement with the upper arm of the spring 30, that arm of the spring will be cammed away from the collar of the locking bolt and permit the lower arm of the spring, which is facing the flat surface of the pin, to press the locking bolt upwardly against the under face of the extension 3. Then when the steering wheel is operated and the recess 35, moves into alignment with the recess 29, the lower arm of the spring will automatically snap the locking bolt into locking engagement in the recess 35 (as shown in dotted lines in Fig. 4) and prevent further rotation of the steering wheel. If the cylinder 18 is rotated through a half revolution, the flat surface of the pin will be shifted to face the upper arm of the spring and the curved surface of the pin will engage the lower arm of the spring and cam it downwardly away from the collar 35ª of the bolt. The upper arm of the spring is then free to engage with the collar 35ª of the locking bolt and shift the bolt downwardly out of the recess 35 and thus release the steering wheel for further operation. This is the unlocked condition: The steering wheel may thus be locked or unlocked by a half revolution of the key. To unlock the closure, the key is operated through a quarter turn from its extreme limits of movement which moves the cylinder into the position shown in Figures 2, 3, 4 and 5 so that the hooked ends 44 may pass through the clearance slots 38 as the closure is removed. In this position the arms of the spring will be separated and both ineffective upon the locking bolt. As the key is always left in one extreme position or the other in which the steering mechanism is either locked or unlocked the closure will be locked closed during practically all of the time and danger of its dropping out is practically nil. The closure is disposed upon an upper face so that for that reason also it will not fall from the recess.

It will be obvious that various changes in the details and arrangements herein described and illustrated may be made by those skilled in the art within the principle and scope of the invention.

I claim:

1. In a lock for vehicles having a relatively stationary part and a member rotating relatively thereto, the combination of an element having a circular disc-like flange adapted to be clamped to said member for rotation therewith in a plane transverse to the relatively stationary part, a longitudinally split sleeve adapted to embrace the said part and having a portion rotatively interlocking with the flange, a split ring clamp adapted to embrace the split sleeve and clamp the sections thereof together and tightly to said part, said clamp having in one of the free ends a pair of intersecting recesses opening from different faces thereof, a screw accessible through one of said recesses and threaded into the other free end of the clamp to bring the free ends together, a locking element carried by the clamp extending into the other of the recesses and adapted to move into and out of locking engagement with the element with the flange for controlling relative movements of the member and the part, mechanism in the said other of the recesses for controlling the movements of the locking element, a lock disposed in and closing the open end of said other of the recesses and operating said mechanism, a closure for the open end of said one of the recesses having an extension interlocking with said mechanism to prevent removal of the closure when the mechanism is in either its locked or unlocked condition and permit of its removal when said mechanism is in an intermediate position.

2. In a lock for vehicles having two relatively moving parts, a clamp secured to one of said parts, one of the arms of the clamp having therein a pair of intersecting recesses opening from different faces thereof, a screw accessible through one of said recesses and threaded into the other arm of the clamp for clamping the arms of the clamp together and to said one of the parts, a locking member carried by the clamp and adapted for movement into and out of a position in which it prevents relative movement of said parts, mechanism in the other of said recesses for operating the locking member, a lock disposed in and closing the open end of said other of the recesses and connected to said mechanism to operate the same, a closure for the open end of said one of the recesses having an extension interlocking with said mechanism to permit removal of the closure when the mechanism is in one position, and prevent removal of the closure when the mechanism is in other positions.

3. In a lock for vehicles having two relatively moving parts, a clamp secured to one of said parts, one of the arms of the clamp having therein a pair of intersecting recesses opening from different faces thereof, a screw accessible through one of said recesses and threaded into the other arm of the clamp for clamping the arms of the clamp together and to said one of the parts, a locking member carried by the clamp and adapted for movement into and out of a position in which it prevents relative movement of said parts, a cylinder rotatively mounted in the other of said recesses and carrying a cam, a spring connected to said locking member for operating the same, said cam being adapted to control the operation of the member by the spring, a lock disposed in and closing the open end of cylinder containing recess, a closure for the open end of the other recess, said closure having an extension interlocking with the cylinder to permit removal of the closure when the cylinder is in one position and prevent it when the cylinder is in another position.

4. In a lock for vehicles having two relatively moving parts, a clamp secured to one of said parts, one of the arms of the clamp having therein a pair of intersecting recesses opening from different faces thereof, a screw accessible through one of said recesses and threaded into the other arm of the clamp for clamping the arms of the clamp together and to said one of the parts, a locking member carried by the clamp and adapted for movement into and out of a position in which it prevents relative movement of said parts, a cylinder rotatively mounted in the other of said recesses and carrying a cam, a spring connected to said locking member for operating the same, said cam being adapted to control the operation of the member by the spring, a lock disposed in and closing the open end of cylinder containing recess, a closure for the open end of the other recess, said cylinder having a radially extending aperture for the passage of a socket wrench to the head of the screw when the cylinder is in one rotative position, said closure having an extension with a hooked end adapted to pass a side of the cylinder in the clearance provided by the aperture and permit removal of the closure when the cylinder is in one rotative position and interlock behind the cylinder when the latter is in other rotative positions to prevent removal of the closure.

5. In a lock for vehicles having two relatively moving parts, a clamp secured to one of said parts, one of the arms of the clamp having therein a pair of intersecting recesses opening from different faces thereof, a screw accessible through one of said recesses and threaded into the other arm of the clamp for clamping the arms of the clamp together and to said one of the parts, a locking member carried by the clamp and adapted for movement into and out of a position in which it prevents relative movement of said parts, a cylinder rotatively mounted in the other of said recesses and carrying a cam, a spring connected to said locking member for operating the same, said cam being adapted to control the operation of the member by the spring, a lock disposed in and closing the open end of cylinder containing recess, a closure for the open end of the other recess, said cylinder having a radially extending aperture for the passage of a socket wrench to the head of the screw when the cylinder is in one rotative position, said closure having a pair of spaced arms extending from the inner face thereof and embracing the cylinder, said arms having hooked ends adapted to pass through the clearance provided by the aperture to permit removal of the closure when the cylinder is in one rotative position and adapted to interlock behind the cylinder to prevent removal of the closure when the cylinder is in other rotative positions.

6. In a vehicle lock, for two relatively moving parts, a locking member carried by one of said parts and adapted for movement into and out of a position in which it prevents relative movement between the parts, a cylinder rotatively carried by said one of the parts, a cam provided upon the cylinder, a leaf spring anchored to said one of the parts and connected to said locking member to stress the same into movement preventing position, said cam being adapted upon rotation of the cylinder to force the spring in an opposite direction and a lock for operating the cylinder.

7. In a vehicle lock for two relatively moving parts, a locking member reciprocatingly carried by one of said parts and adapted for movement into and out of a position in which it prevents relative movement between the parts, a pair of springs acting upon the member to stress it in opposite directions into or out of movement preventing position, a cam operable when shifted to render said spring devices inactive upon the locking member alternately, whereby but one of said devices is effective upon the locking member at any time, and a lock controlled device for operating the cam.

8. In a lock for vehicles having steering mechanism with a relatively stationary element and a wheel movable relatively thereto, a clamping ring embracing the stationary element, a screw acting between the adjustable ends of the ring to tighten the ring upon the stationary element, the end of the ring with which the head of the screw engages having therein a recess, the head of the screw being concealed within and accessible for operation from the recess, a member rotatable in said recess and permitting access of a socket wrench to the head of the screw when in one rotative position, said ring having a second recess intersecting the first recess through which the said screw and a socket wrench may pass, means carried by the ring and controlled by the member for permitting or preventing rotation of the wheel, a lock closing the first recess and operable to rotate the member to cause a locking or unlocking of the wheel, and a closure for the second recess having an interlocking engagement with the member whereby removal of the closure is permitted when the member is in one rotative position and prevented in other rotative positions.

9. In a lock for vehicles having steering mechanism with a relatively stationary element and a wheel movable relatively thereto, a clamping ring embracing the stationary element, a screw acting between the adjustable ends of the ring to tighten the ring upon the stationary element, the end of the ring with which the head of the screw engages having therein a recess, the head of the screw being concealed within and accessible for operation from the recess, a member rotatable in said recess and permitting access of a socket wrench to the head of the screw when in one rotative position, said ring having a second recess intersecting the first recess through which the said screw and a socket wrench may pass, means carried by the ring and controlled by the member for permitting or preventing rotation of the wheel, a lock closing the first recess and operable to rotate the member to cause a locking or unlocking of the wheel, a closure for the second recess having a pair of arms extending therefrom into the recess to embrace the member, said arms having hooked ends to interlock with the member and prevent removal of the closure, said member having clearance on opposite sides thereof for said hooked ends whereby removal of the closure is permitted when the member is in one rotative position.

10. In a lock for vehicles having steering mechanism with a relatively stationary element and a wheel movable relatively thereto, a clamping ring embracing the stationary element, a screw acting between the ends of the ring for clamping the ring upon the stationary element, the end of the ring with which the head of the screw engages having therein a recess and the head of the screw being accessible for operation from the recess, a member rotatable in said recess and permitting access to the head of the screw when in one rotative position, a lock mounted in said recess and operable to rotate the cylinder, means operated by the member for preventing rotation of the wheel when the member is in one position, said ring having a second recess communicating with the first recess and through which access is had to the screw head, means accessible through the second recess for securing the lock within the first recess, a closure for the second recess, a closure for the second recess interlocking with the member whereby removal of the closure is permitted when the member is in one rotative position and prevented when the member is in other rotative positions.

11. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, locking means carried by the recessed arm and operable to prevent relative movement of the parts, locking mechanism disposed in the other of said recesses and controlling said locking means, said closure interlocking with the locking means whereby the removal of the closure is prevented when said means is in its normally effective position to prevent relative movement of the parts and permitted when the locking means is in another position.

12. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, means including a locking member carried by the recessed arm and operable to prevent relative movement of the parts, locking mechanism disposed in the other of said recesses and controlling said locking means, means accessible through said one of the recesses when said recess is open for securing the locking mechanism within the other recess, said closure interlocking with the locking means whereby the removal of the closure is prevented when said means is in its normally effective position to prevent relative movement of the parts and permitted when the locking means is in another position.

13. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, means including a rotating member carried by the recessed arm and operable to prevent relative movement of the parts and locking mechanism disposed in the other of said recess and controlling said locking means, said closure having an extension normally interlocking with said rotating member to prevent removal of the closure when the member is in its position in which relative movement of the parts will be prevented and permit removal when said member is in another position.

14. In a lock for vehicles having two relatively moving parts, a clamp embracing and carried by one of the parts, one of the arms of the clamp having therein two communicating recesses leading from different faces, a screw passing through one of the arms of the clamp and threaded into the other, the screw being introduced and accessible for tightening the clamp through one of said recesses, a closure for the last mentioned recess, locking means carried by the recessed arm and operable to prevent relative movement of the parts, key operated locking mechanism disposed in the other of said recesses and operating said locking means, removal of the key for said mechanism being permitted when the locking mechanism is in either of two extremes of movement in which the locking means is either fully effective or ineffective, and prevented when said mechanism is in an intermediate condition, said closure having an interlocking engaging relation with said locking means to prevent removal of the closure when the mechanism is in either extreme of movement and permit removal of the closure when the locking mechanism is in an intermediate condition, whereby removal of the closure is permitted when the key is in an intermediate position of its movement and prevented in other positions of its movement.

15. In a lock for vehicles having two relatively moving parts, a base member carried by one of the parts and having a recess therein, a locking member carried by the base member and operative to and from a position in which it prevents relative movement of the parts, a locking device in said recess for controlling the movements of said member and including a rotating member, having a clearance space in a portion of its periphery, a closure for said recess having an extension normally interlocking with said rotating member to prevent removal of the closure and passing through the clearance in said rotating member to permit removal of the closure when the rotating member is in one position.

In witness whereof, I hereunto subscribe my signature.

ERNEST SIEGEL.